United States Patent [19]
Noland

[11] Patent Number: 4,785,891
[45] Date of Patent: Nov. 22, 1988

[54] TILLING RIDGER

[76] Inventor: Ronald D. Noland, Rte. 1, Box 321, Advance, Mo. 63730

[21] Appl. No.: 916,951

[22] Filed: Oct. 8, 1986

[51] Int. Cl.[4] .................. A01B 13/02; A01B 39/14
[52] U.S. Cl. ..................... 172/579; 172/574; 172/567; 172/599; 172/185
[58] Field of Search .............. 172/185, 187, 154, 158, 172/161, 184, 567, 574, 600, 582, 441, 442, 159

[56] References Cited

U.S. PATENT DOCUMENTS

| 506,429 | 10/1893 | Hancock | 172/575 |
|---|---|---|---|
| 759,782 | 5/1904 | Ward | 172/576 X |
| 860,399 | 7/1907 | Lynham | 172/158 X |
| 1,625,379 | 4/1927 | Sweeney | 172/567 |
| 1,740,874 | 12/1929 | Polhemus | 172/600 X |
| 2,539,632 | 1/1951 | Miller | |
| 2,747,488 | 5/1956 | Norton | 172/574 |
| 3,088,527 | 5/1963 | Burch | 172/574 |
| 3,209,840 | 10/1965 | Lehman | 172/600 |

FOREIGN PATENT DOCUMENTS 268830  6/1964  Australia ................... 172/600

OTHER PUBLICATIONS

Hiniker Econ—o—till 3000/3500 advertizing brochure of Hiniker Co., Mankato, MN.
Burch "Hippin Ridger", Advertising brochure of Burch, Inc., Evansville, Indiana, 9/1972.
Rippin Ridger, Advertising Brochure of Burch, Inc., Evansville, Indiana.
Amco Bedding Hipper, Advertising Brochure of Amco Products, 9/1972, Yazoo City, Miss.
John Deere Ripper Bedders and Toolbars Tool Catalog of John Deere, Inc., Moline, Ill.

Primary Examiner—Richard J. Johnson

[57] ABSTRACT

A disc ridger having an arrangement of disc gangs that substantially eliminates sidewise draft or clogging tendencies found in previous disc ridgers, also incorporating additional discs located for completing the tillage of the area swept by the disc ridger is described.

8 Claims, 2 Drawing Sheets

TILLING RIDGER

BACKGROUND OF THE INVENTION

This invention relates to agricultural bedding and tillage implements and specifically to improvements to the disc ridger that is adapted to ridging a set of rows simultaneously while being drawn forward by a tractor such as that patented by Burch in 1963, U.S. Pat. No. 3,088,527. The implement is commonly called a disc bedder in the literature and is also called a disc hipper in some regions. The common form of disc ridger, which is in wide use, has a ridge-forming disc gangs rotatably mounted upon gang support arms, which are arrayed along a transverse frame into a leading and a trailing rank. Each disc gang has a short gang axle with a concave disc mounted at each end. The axle is centrally mounted in a pair of bearings mounted at the end of a gang support arm that has its other end clamped to a transverse frame. The disc gangs are typically mounted with the concave face of each disc tilted upward at an angle of 10 to 20 degrees from vertical and twisted forward at an angle of 20 to 30 degrees from the direction of travel to give it an effective forward cutting angle, however the tilt and twist may vary between much wider limits if desired. There are two disc gangs, each usually having a furrowing disc and a ridging disc, for tilling the valley between each pair of ridges. The gangs follow each other moving soil in opposite directions. The valleys at the outside edges have only one disc gang each, which completes the tillage on a subsequent, adjacent pass in the opposite direction. Some ridgers, particularly those made for narrow rows, have only one disc per gang. The first disc used on the gang will be called a ridging disc; when two discs are used the second will occupy the position further from the center of the row and will be called a furrowing disc.

The disc ridgers were originally made in a configuration that I will refer to as unilateral staggered. In this configuration, all of the leading-rank disc gangs are turned so that the concave side of each disc faces toward one side of the implement while all of the trailing-rank disc gangs are turned so that the concave side of each disc faces toward the other side; and the disc gangs of pairs that move soil into a ridge between themselves are mounted in alternate ranks. This configuraion is inherently resistant to clogging on vegetation and soil, however, it has a severe side draft problem when tilling tough soils.

An answer to the side draft problem was to switch to the opposed configuration; wherein, the disc gangs of pairs that move soil into a ridge between themselves are mounted in the same rank. The problem with the opposed configuration is that it readily clogs on a soil-vegetation mixture in the narrowed throat between pairs of opposed gangs. This problem becomes severe enough for narrow, 30 inch, rows that single-disc gangs rather than double-disc gangs are sometimes used to allow a wider throat.

Both configurations suffer from another severe limitation; neither tills but about half of the area swept by the implement. The central part of each row is left untilled although it may be buried under soil from the furrows; also, neither type is considered suitable for the incorporation of herbicides, fertilizer, or other chemicals into the soil because of a lack of mixing action.

These limitations necessitate the use of another form of tillage before the ridging operation in order to till the soil for disposal of previous crop residues and growing vegetation and, also, for chemical incorporation. After ridging, when the fresh beds have been settled by rain, a different implement is used to till germinating vegetation from the beds and flatten their tops prior to planting; thus, three separate implements have been necessary to ready land for planting on ridges.

SUMMARY OF THE INVENTION

The objects of the invention are to make a disc ridger with a laterally balanced draft while maintaining a strong resistance to clogging and, further, to make a disc ridger which provides tillage over the entire area swept by the ridger.

The first object has been attained by the use of a bilateral staggered arrangement of the disc gangs around a parting line. In this arrangement, the leading rank disc gangs have their discs facing concave forward, upward, and away from the parting line thereby forming a diverging rank which moves soil outward while, except for the parting-furrow-complemental disc gang as noted in the next paragraph, the trailing rank disc gangs have their disc facing concave forward, upward, and toward the parting line thereby forming a converging rank which moves soil inward. The parting line divides the set of rows within the rear wheel span of the tractor that draws the ridger and should coincide with the center line of the ridger when it has an even number of rows; however, the parting line should be one-half row from the center line when the ridger has an odd number or rows. The parting line delimits the innermost lateral position with respect to the ridger and the rows under tillage by the ridger; outward is defined as toward either side of the ridger from the parting line.

The problem, which must be solved in this arrangement of the disc gangs, is that it is necessary to have two discs to cut a parting furrow along the parting line as soil must be moved toward each side from the parting furrow. As there is space for only one furrowing disc along the parting line in the front rank where it is desired to have all diverging disc gangs, one of the furrowing discs for cutting the parting furrow has been located in the trailing rank and mounted separately in a single-disc gang. It is termed the parting-furrow-complemental disc gang in the preferred embodiment. This disc gang is in opposition to a disc gang mounted across the row but not as closely as if it were a double-disc gang. Clogging is, therefore, much less likely.

Clogging is largely a function of chance, clearance, and quantity and type of trash. My ridger has only one row in opposition, and it is not in close opposition. Clogging should be reduced to a minor problem under ordinary conditions. If it is wished to use the ridger in trashy conditions, it should be equipped with notched disc blades, particularly, in the leading rank and on the parting-furrow-complemental disc gang.

In the bilateral staggered arrangement, staggering has been preserved, that is; the pair of disc gangs which throw soil into a common row are in alternate ranks with the exception of the pair comprising the parting-furrow-complemental disc gang.

An alternate form of bilateral staggered ridger can be made having an unidirectional plow located behind the leading rank furrowing disc for the parting line but shaped to throw soil toward the opposite side.

A bilateral staggered ridger can also be made with a double moldboard plow, such as a lister, substituted for both of the discs used for furrowing along the parting line, however, if this is done, it will be well to use a disc colter ahead of it in order to prevent trash from clogging it.

The second object, providing tillage over the entire area swept by the ridger, has been attained by the use of an additional disc, called a ridge-tilling disc, rotatably mounted to the ridger upon a common axle with each leading-rank, ridge-forming disc gang, spaced to perform tillage of the central part of the row.

Tillage discs may be mounted in close proximity if they are arranged in an echelon wherein each disc is faced concave forward and away from each succeeding disc; when arranged in this manner, the leading disc opens a furrow and rolls the soil away from the succeeding disc which then breaks loose a strip of soil spanning to the leading disc furrow, called the furrow slice, and rolls it sidewise to the rear of the leading disc and so forth along the echelon of discs. Thus the addition of the ridge-tilling disc for cutting a central furrow along the central part of the row enables the adjacent disc of the leading-rank, ridge-forming disc gang to break loose a furrow slice spanning to the central furrow, and it enables the ridging disc of the trailing-rank, ridge-forming disc gang to break loose a furrow slice spanning to the central furrow from the other side, thus, by the addition of a ridge-tilling disc to the leading-rank, ridge-forming disc gang, tillage of the surface of the row can be completed.

It is not necessary that the ridge-tilling disc be rotatably mounted to the ridger upon a common axle in a straight line echelon with the ridge forming disc gang, however, the ridge-tilling disc must always be faced concave forward and away from the adjacent ridging disc of the leading-rank, ridge-forming disc gang for the row so that the soil tilled by the ridge-tilling disc will be moved away from the adjacent ridging disc; this allows the discs to be mounted alongside each other, overlapping along a fore-and-aft line, however, the ridge-tilling disc should be mounted where it overlaps the leading edge of the adjacent ridging disc; that is, forward of the position where the leading edge of the ridge-tilling disc is aligned transversely with the leading edge of the adjacent ridging disc but no further forward than zero overlapping, when the trailing edge of the ridge-tilling disc is aligned transversely with the leading edge of the adjacent ridging disc. The rearward limit is necessary to prevent the ridge-tilling disc from interfering with soil moved by the adjacent ridging disc, and the forward limit is imposed to avoid unduly extending the implement along a fore-and-aft line, which would make it less suitable for a tractor mounted implement.

A separate gang support arm can be used to mount the ridge-tilling disc if it is desired to till the central portion of the ridge at a different depth than that which is fixed in relation to the ridge-forming disc gang by the elevation angle of the axle which is used in common with the ridge-forming disc gang, or if the row is wide, a plurality of discs may be mounted upon the separate gang support arm to provide level tillage over a broad central portion of the row, or if desired, discs of unequal size may be mounted upon a common axle to change the relative tillage depth of the ridge-tilling, ridge-forming, and furrowing discs.

As with any tillage disc, the ridge-tilling disc should be mounted concave forward at a moderate acute angle, perhaps 10 to 45 degrees, so it will cut and roll soil sidewise. It is not necessary that it be tilted upward, as it will usually be when mounted upon the same axle with a ridge-forming gang, however, downward angles are to be avoided as stress on the disc and bearings will increase.

The ridge-tilling disc may be used on disc ridgers having an unilateral or a bilateral staggered configuration; it is not intended for a disc ridger having an opposed configuration in the leading rank, accordingly, my claims refer to the leading-rank, ridge-forming disc gang for the row in the singular.

A ridger thus equipped for tillage in the central portion of each row as well as the outer portions can be used for tilling germinating vegetation from bedded rows immediately prior to planting, particularly, if it is equipped with a drag board or harrow to flatten the row tops, and, if desired, planter units can be mounted upon the rear of a drag board equipped tilling ridger.

When ridges are tilled with the tilling ridger, the depth of tillage may be set deep enough for removal of growing vegetation while leaving ridges having cores of untilled soil which are covered with a blanket of tilled soil. This permits grading a flat top along each ridge and planting seed upon soil which retains its moisture because it has not been detached from the subsoil while it is covered with a blanket of insulating tilled soil; this method of planting promotes excellent germination of the seed without requiring additional rainfall.

The tilling ridger may be used to rebuild ridges and incorporate the residue from previous crops; it may also be used to build ridges on previously tilled or untilled soil or to till growing vegetation from ridges after they are made.

A tank containing herbicides, fertilizer, or other chemicals along with an accompanying distribution system may be mounted upon the tilling ridger for application during tillage.

If deep tillage is desired, chisels or subsoilers may be added to the tilling ridger, preferably following the trailing rank of gangs for less interference from trash.

The concept of a bilateral staggered arrangement of disc gangs is not applicable to a ridger made for a single row; it must be applied to a ridger made for a set of rows, that is an adjoining plurality of rows which can be tilled simultaneously by the ridger. The preferred embodiment shows a ridger for a set of four rows. The staggered arrangement shown for the pair of disc gangs on each outer row should be repeated when adding disc gangs for additional rows on each side.

DESCRIPTION OF THE PREFERRED EMBODIMENT

Figure 1:
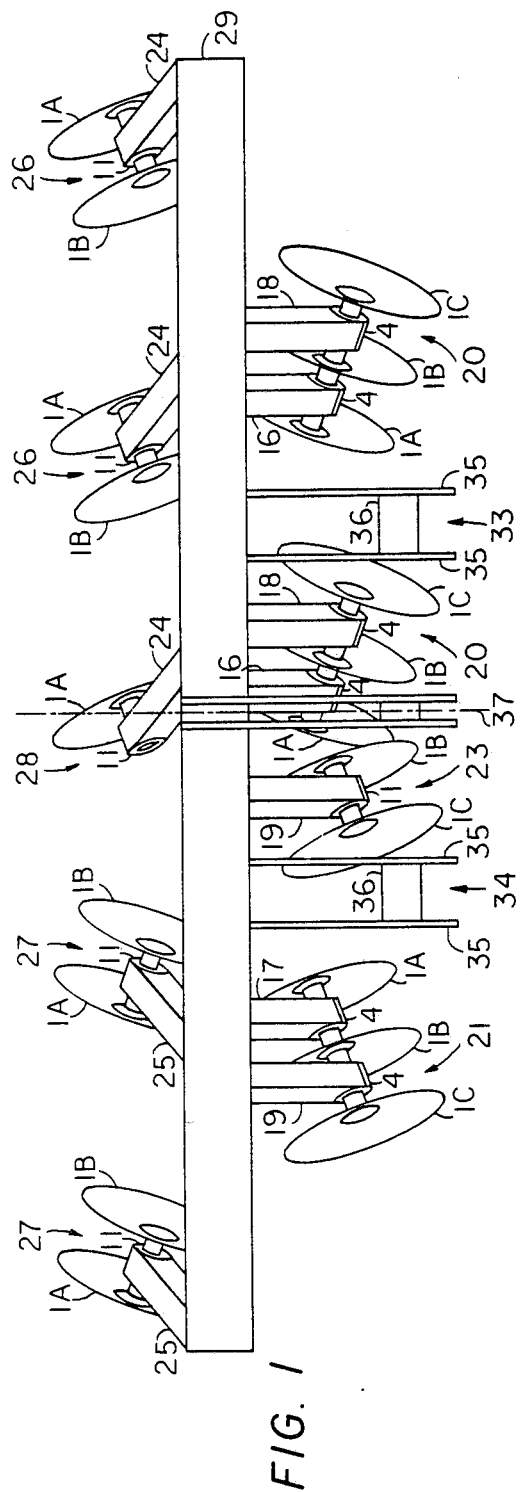
FIG. 1 is a plan view of the tilling ridger for a set of four rows; the position and orientation of the ridge-tilling discs, as well as the bilateral staggered arrangement of the disc gangs, is shown most clearly in this view.
Figure 2:
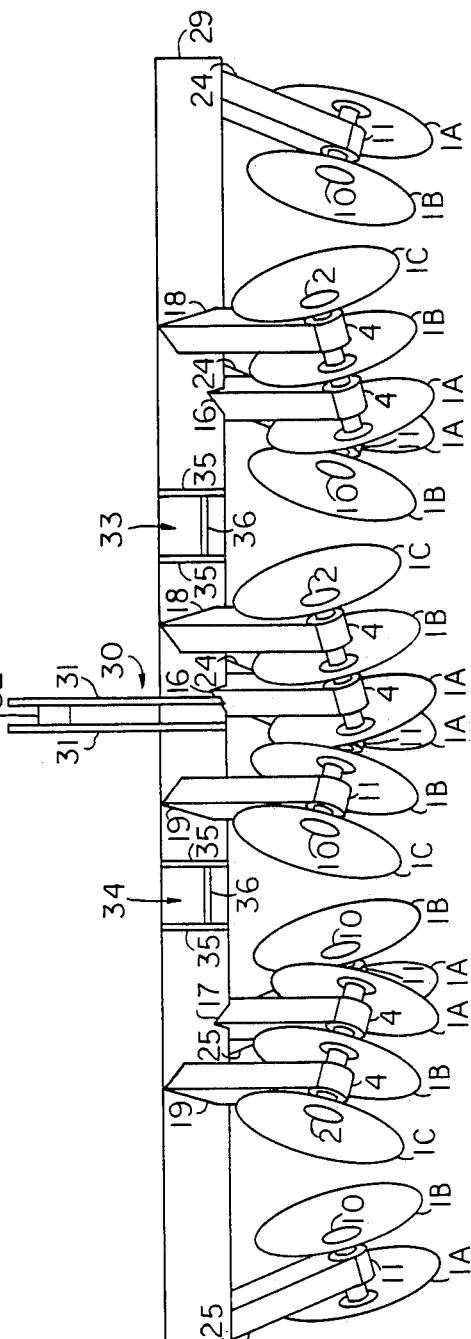
FIG. 2 is a front view of the tilling ridger for a set of four rows; this view displays the complete tillage coverage which the machine provides.
Figure 3:
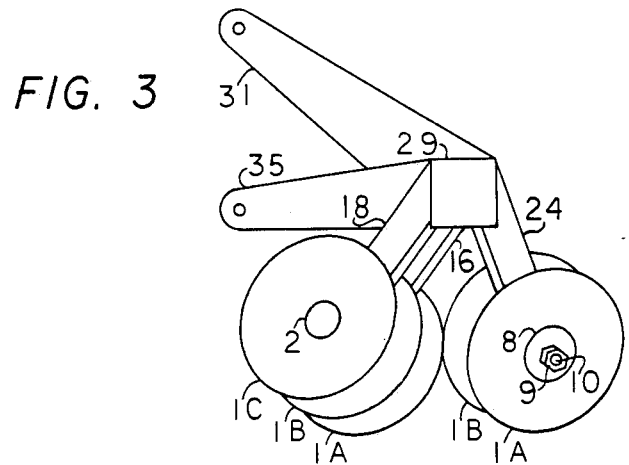
FIG. 3 is a side view of the tilling ridger.
Figure 4:
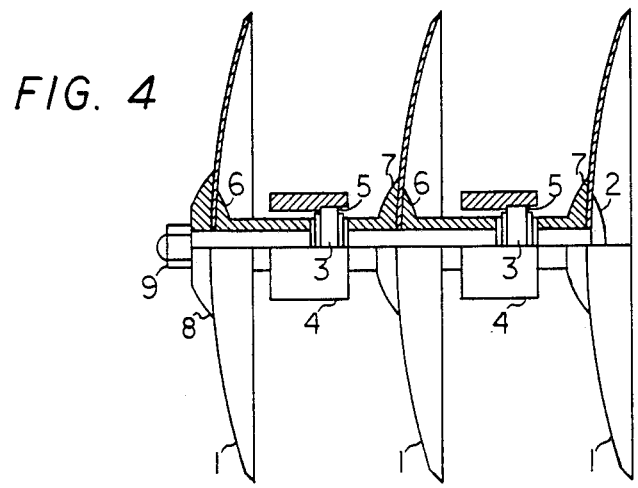
FIG. 4 is a half section view of a triple-disc gang.
Figure 5:
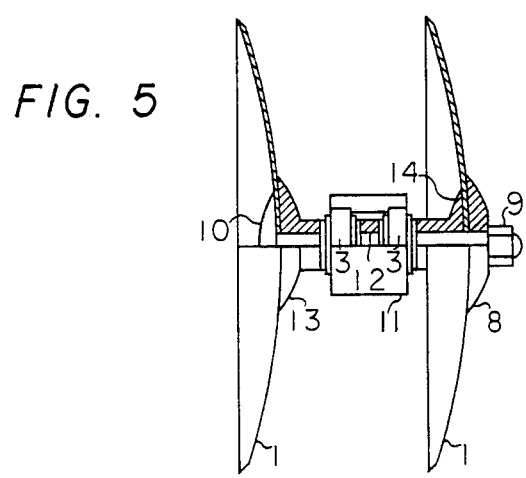
FIG. 5 is a half section view of a double-disc gang.
Figure 6:
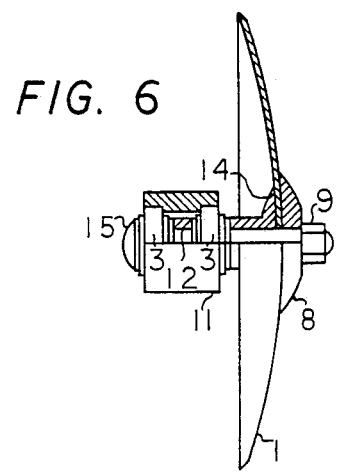
FIG. 6 is a half section view of the single-disc gang.

Referring to the drawings in detail, where the usual left-right convention is used in which the observer stands behind the machine while facing in the direction of travel, and focusing first upon the triple-disc-gang drawing, FIG. 4: three concave disc blades 1 are rotatably mounted by being placed upon a triple-disc-gang axle 2 with a pair of sealed bearings 3; each of which is pressed into one of a pair of single-bearing hubs 4 and retained by a snap ring 5. Extension convex spools 6 and long concave spools 7 space the assembly which is clamped together with an end washer 8 held by a nut 9. Referring also to FIGS. 1 and 2 and noting that concave disc blades, which were indicated as 1 in FIGS. 4, 5, and 6, are given additional letter identification as 1A, 1B and 1C in order to indicate the function of each disc by virtue of its position on the ridger. A furrowing disc is labled 1A; a ridging disc is labled 1B; and a ridge-tilling disc is labled 1C. A ridge-forming disc gang usually comprises a furrowing disc 1A and a ridging disc 1B, although the two functions can be combined in a single-disc gang, particularly, when making a machine for narrow rows. A ridge-forming-tilling disc gang usually comprises a furrowing disc 1A, a ridging disc 1B, and a ridge-tilling disc 1C, although here too, the functions of the furrowing and ridging discs may be combined. The pair of single-bearing hubs 4 may be welded to a pair of gang standards composed of an inner-left, leading-rank gang standard 16 and an outer-left, leading-rank gang standard 18 in order to form the pair of gang support arms for a left, leading-rank, ridge-forming-tilling disc gang 23. A pair of single-bearing hubs 4 may be welded to a pair of gang standards composed of an inner-right, leading-rank gang standard 17 and an outer-right, leading-rank gang standard 19 in order to form the pair of gang support arms for a right, leading-rank, ridge-forming-tilling disc gang 21. In the double-disc-gang drawing, FIG. 5, two disc blades 1 are rotatably mounted by being placed upon a double-disc-gang 10 with a pair of sealed bearings 3 which are pressed into a dual-bearing hub 11 and held against a spacer 12 by a short concave spool 13 and a short convex spool 14. The assembly is clamped together with and end washer 8 held by a nut 9. Referring to FIGS. 1 and 2, a dual-bearing hub 11 is welded to an outer-right, leading-rank gang standard 19 in order to form the gang support arm for the right, leading-rank, ridge-forming-tilling, partial disc gang 23. A dual-bearing hub 11 may be welded to a left, trailing-rank gang standard 24 in order to form the gang support arm for a left, trailing-rank, ridge-forming disc gang 26. A dual bearing hub 11 may be welded to a right, trailing-rank gang standard 25 in order to form the gang support arm for a right, trailing-rank, ridge-forming disc gang 27. In the single-disc-gang drawing, FIG. 6, a disc blade 1 is rotatably mounted by being placed upon a single-disc-gang axle 15 with a pair of sealed bearings 3 which are pressed into a dual-bearing hub 11 and held against a spacer 12 by the axle 15 and a short convex spool 14. The assembly is clamped together with an end washer 8 held by a nut 9. Referring to FIGS. 1 and 2, the dual-bearing hub 11 is welded to a left, trailing-rank gang standard 24 in order to form the gang support arm for the parting-furrow-complemental disc gang 28. The gang standards 16, 17, 18, 19, 24, and 25 are made from rectangular structural tube and are welded to a transverse main frame 29 made from square structural tube.

Provision for attachment of the transverse main frame 29 to a tractor hitch includes a top-link mast 30; composed of two mast sides 31 with a mast spacer 32 welded between them; and a left lower-link bracket 33 and a right lower-link bracket 34, each of which is constructed from a pair of hitch sides 35 with a hitch spacer 36 welded between them. The top-link mast 30 and the lower-link brackets 33 and 34 are welded to the transverse main frame 29. A parting line 37 is drawn through the center of the tilling ridger in FIG. 1.

Though the drawings, FIGS. 1 and 2, appear to show that the furrowing disc 1A of the left, leading-rank, ridge-forming-tilling disc gang 20 that is mounted over the parting line 37 may be touching the rear surface of the ridging-disc 1B of the right, leading-rank, ridge-forming-tilling, partial disc gang 23, it is important that a clearance of about one-half inch or more be maintained between the discs in order to prevent contact. If the discs are allowed to interfere, especially through a layer of mud, it can slow the rotation of the furrowing disc 1A and lead to clogging because the tangential velocity at the circle of contact on the ridging disc 1B is much less than the tangential velocity of the outer edge of the furrowing disc 1A. Clearance is obtained by moving the ridging disc 1B closer to its adjacent ridge-tilling disc 1C.

I claim:
1. An improved disc ridger of the type having a leading rank and a trailing rank of ridge-forming disc gangs for ridging a set of rows, in which each gang has a concave ridging disc and a concave furrowing disc, which are mounted on a gang axle being held in a rotary mount attached to one end of a gang support arm that is attached at the other end to a transverse frame having means for tractor attachment; and one of the leading-rank, ridge-forming disc gangs is positioned on one side of each row of the set with one of the trailing-rank, ridge-forming disc gangs positioned on the other side; and the concave face of each disc is set at an effective forward cutting angle while facing generally toward the center of the row it is positioned on whereby soil is cut and rolled toward the center of each row of the set so as to build a set of ridges as the ridger is drawn foward by a tractor, wherein the improvement comprises;
   (a) a concave ridge-tilling disc for each leading-rank, ridge-forming disc gang;
   (b) a common gang axle for each leading-rank, ridge-forming disc gang, which has a greater length then its gang axle and is installed to replace its gang axle, on which the ridge-tilling disc is mounted over the central part of the row and adjacent to the ridging disc of the leading-rank, ridge-forming disc gang but with the concave side facing away from the adjacent ridging disc whereby the ridge-tilling disc is mounted in position and faced at an effective forward cutting angle to cut a furrow slice from the central part of the row and roll it away from the adjacent ridging disc; the combination of the ridge-tilling disc with the leading-rank, ridge-forming disc gang on a common axle being called a leading-rank, ridge-forming-tilling disc gang;
   (c) an arrangement of the leading-rank, ridge-forming-tilling disc gangs, in which one gang is positioned over the inner half of each row of the set, except the row adjacent to a parting line on a first side, with the concave side of each of its discs faced generally away from the parting line;
   (d) a leading-rank, ridge-forming-tilling, partial disc gang having a concave ridging disc and a concave ridge-tilling disc, which is mounted in the leading rank with its ridge-tilling disc located over the central part of the row that is adjacent to the parting line on the first side; and its ridging disc is located between its ridge-tilling disc and the parting line; and both of its discs are set at an effective forward cutting angle while facing generally outward from the parting line;

(e) a parting-furrow-complemental disc gang having a concave furrowing disc, which is mounted in the trailing rank over the parting line with the concave face of its furrowing disc set at an effective forward cutting angle and faced generally outward from the parting line in the same direction as the leading-rank, ridge-forming-tilling, partial disc gang it complements whereby the parting-furrow-complemental disc gang in combination with the leading-rank, ridge-forming-tilling partial disc gang and the leading-rank, ridge-forming-tilling disc gangs till and move soil outward from the inner half of each row to form tilled inner slopes for a set of ridges; and (f) an arrangement of the trailing-rank, ridge-forming disc gangs, in which one gang is positioned over the outer portion of each row of the set with the concave side of each of its discs facing generally in toward the parting line in order to till and move soil inward from the outer half of each row to form tilled outer slopes for the set of ridges.

2. An improved disc ridger of the type having a leading rank and a trailing rank of ridge-forming disc gangs for ridging a set of rows, in which each gang has a ridging disc having a concave soil engaging face, which is mounted on a gang axle being held in a rotary mount attached to one end of a gang support arm that is attached at the other end to a transverse frame having means for tractor attachement; and one of the leading-rank, ridge-forming disc gangs is positioned on one side of each row of the set with one of the trailing-rank, ridge-forming disc gangs positioned on the other side; and the concave face of the ridging disc of each gang is set at an effective forward cutting angle and faced generally toward the center of the row it is positioned on whereby soil is cut and rolled toward the center of each row of the set so as to build a set of ridges as the ridger is drawn forward by a tractor wherein the improvement comprises for each row of the set:

(a) a ridge-tilling disc having a concave soil engaging face and (b) means for rotatably mounting the ridge-tilling disc to the ridger, in which the ridge-tilling disc is positioned over the central part of the row where it overlaps the leading edge of the ridging disc of the leading-rank, ridge-forming disc gang for the row fore-and-aft wise; and the concave face of the ridge-tilling disc is set at an effective forward cutting angle and faced generally away from the ridging disc of the leading-rank, ridge-forming disc gang for the row whereby the ridge-tilling disc is positioned to cut a furrow slice from the central part of the row and roll it away from the ridging disc of the leading-rank, ridge-forming disc gang for the row thereby leaving an open furrow into which it can roll a furrow slice.

3. A disc ridger according to claim 2, in which the means for rotatably mounting the ridge-tilling disc to the ridger comprises: a common gang axle having a greater length than the gang axle for the leading-rank, ridge-forming disc gang for the row and replacing it, on which the ridge-tilling disc is mounted adjacent to the ridging disc of the leading-rank, ridge-forming disc gang for the row in fixed relationship so that they rotate in unison.

4. An improved ridger of the type having a leading rank and a trailing rank of ridge-forming disc gangs for ridging a set of rows, in which each gang has a ridging disc having a concave soil engaging face, which is mounted on a gang axle being held in a rotary mount attached to one end of a gang support arm that is attached at the other end to a transverse frame having means for tractor attachment; and one of the leading-rank, ridge-forming disc gangs is positioned on one side of each row of the set with one of the trailing-rank, ridge-forming disc gangs positioned on the other side; and the concave face of the ridging disc of each gang is set at an effective forward cutting angle and faced generally toward the center of the row it is positioned on whereby soil is cut and rolled toward the center of each row of the set so as to build a set of ridges as the ridger is drawn forward by a tractor, wherein the improvement comprises:

(a) means for cutting a furrow along a parting line that divides the set of rows within the rear wheel span of the tractor and moving soil from the furrow outward in each direction to build an inner slope along each row bordering the parting line, (b) a diverging rank of the ridge-forming disc gangs, wherein one of the gangs is mounted over the inner portion of each of the rows that does not border the parting line; and the concave face of the ridging disc of each gang is set at an effective forward cutting angle and faced generally outward from the parting line to build an inner slope along each row under tillage by the diverging rank; and (c) a converging rank of the ridge-forming disc gangs, wherein one of the gangs is mounted over the outer portion of each of the rows of the set; and the concave face of the ridging disc of each gang of the converging rank is set at an effective forward cutting angle and faced generally in toward the parting line to build an outer slope along each row of the set.

5. A ridger according to claim 4, in which the means for cutting the furrow along the parting line and moving the soil from the furrow outward in each direction comprises:

(a) one of the ridge-forming disc gangs, which is mounted in the leading rank where it overlaps the parting line; and the concave soil engaging face of its ridging disc is set at an effective forward cutting angle and faced generally outward in one direction from the parting line; and (b) a parting-furrow-complemental disc gang mounted in the trailing rank and over the parting line, which has a disc having a concave soil engaging face set at an effective forward cutting angle while facing generally outward in the other direction from the parting line.

6. A disc ridger according to claim 5, further comprising for each row of the set:

(a) a ridge-tilling disc having a concave soil engaging face and (b) means for rotatably mounting the ridge-tilling disc to the ridger, in which the ridge-tilling disc is positioned in the central part of the row where it overlaps the leading edge of the ridging disc of the leading-rank, ridge-forming disc gang for the row fore-and-aft wise; and the concave face of the ridge-tilling disc is set at an effective forward cutting angle and faced generally away from the ridging disc of the leading-rank, ridge-forming disc gang for the row whereby the ridge-tilling disc is positioned to cut a furrow slice from the central part of the row and roll it away from the ridging disc of the leading-rank, ridge-forming disc gang for the row thereby leaving an open furrow into which it can roll a furrow slice.

7. A disc ridger according to claim 6, in which the means for rotatably mounting the ridge-tilling disc to the ridger comprises: a common gang axle having a greater length than the gang axle for the leading-rank, ridge-forming disc gang for the row and replacing it, on which the ridge-tilling disc is mounted adjacent to the ridging disc of the leading-rank, ridge-forming disc gang for the row in fixed relationship so that they rotate in unison.

8. A disc ridger according to claim 7, in which the diverging rank of the disc gangs is positioned in front of the converging rank of disc gangs.

* * * * *